United States Patent [19]
Shelton et al.

[11] Patent Number: 5,637,245
[45] Date of Patent: Jun. 10, 1997

[54] METHOD AND APPARATUS FOR MINIMIZING DEGRADATION OF EQUIPMENT IN A LASER CLEANING TECHNIQUE

[75] Inventors: Timothy F. Shelton, Xenia; Jeffrey L. Dulaney, Dublin, both of Ohio

[73] Assignee: Vernay Laboratories, Inc., Yellow Springs, Ohio

[21] Appl. No.: 421,564

[22] Filed: Apr. 13, 1995

[51] Int. Cl.$^6$ ................................. B23K 26/00
[52] U.S. Cl. ...................... 219/121.85; 219/121.69; 219/121.84; 134/1
[58] Field of Search .......... 219/121.6, 121.68, 219/121.69, 121.84, 121.85; 134/1, 21; 264/400

[56] References Cited

U.S. PATENT DOCUMENTS

| | | | |
|---|---|---|---|
| Re. 33,777 | 12/1991 | Woodroffe | 134/1 |
| 3,503,804 | 3/1970 | Schneider | 219/121.84 |
| 3,679,863 | 7/1972 | Houldcroft et al. | 219/121.84 |
| 4,125,757 | 11/1978 | Ross . | |
| 4,368,080 | 1/1983 | Langen et al. | 134/1 |
| 4,629,859 | 12/1986 | Reddy | 219/121.85 |
| 4,720,621 | 1/1988 | Langen . | |
| 4,803,021 | 2/1989 | Werth et al. | 219/121.85 |
| 4,987,286 | 1/1991 | Allen | 219/121.84 |
| 5,024,968 | 6/1991 | Engelsberg | 437/173 |
| 5,034,592 | 7/1991 | Chun | 219/121.84 |
| 5,072,092 | 12/1991 | Richter et al. | 219/121.72 |
| 5,099,557 | 3/1992 | Engelsberg | 29/25.01 |
| 5,111,023 | 5/1992 | Horibe et al. | 219/121.85 |
| 5,142,120 | 8/1992 | Hanson et al. | 219/121.83 |
| 5,151,134 | 9/1992 | Boquillon | 134/1 |
| 5,257,706 | 11/1993 | McIntyre | 219/121.69 |
| 5,293,023 | 3/1994 | Haruta et al. | 219/121.6 |
| 5,303,081 | 4/1994 | Totsuka et al. | 359/213 |
| 5,373,140 | 12/1994 | Nagy et al. | 219/121.68 |
| 5,482,561 | 1/1996 | Yeung | 134/1 |

Primary Examiner—Teresa J. Walberg
Assistant Examiner—Gregory L. Mills
Attorney, Agent, or Firm—Biebel & French

[57] ABSTRACT

A method and apparatus for cleaning equipment surfaces using a laser. A barrier layer is provided at a surface to be cleaned prior to being impinged by light from a laser in order to avoid degradation in the form of oxidation of the surface. The laser light causes residual material on the surface to be removed while the barrier layer ensures that energy from the laser light is evenly distributed. In addition, the barrier layer shields the surface from oxygen to thereby prevent oxidation of the surface.

19 Claims, 1 Drawing Sheet

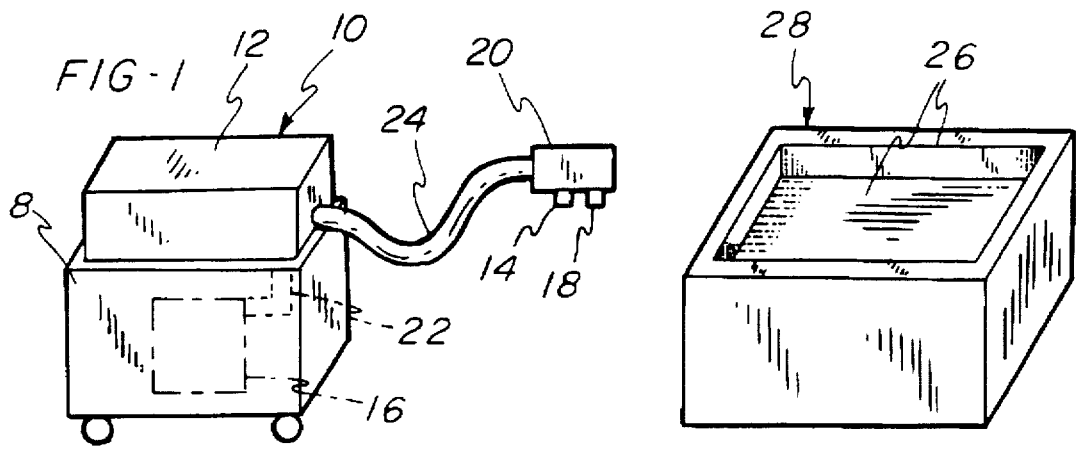
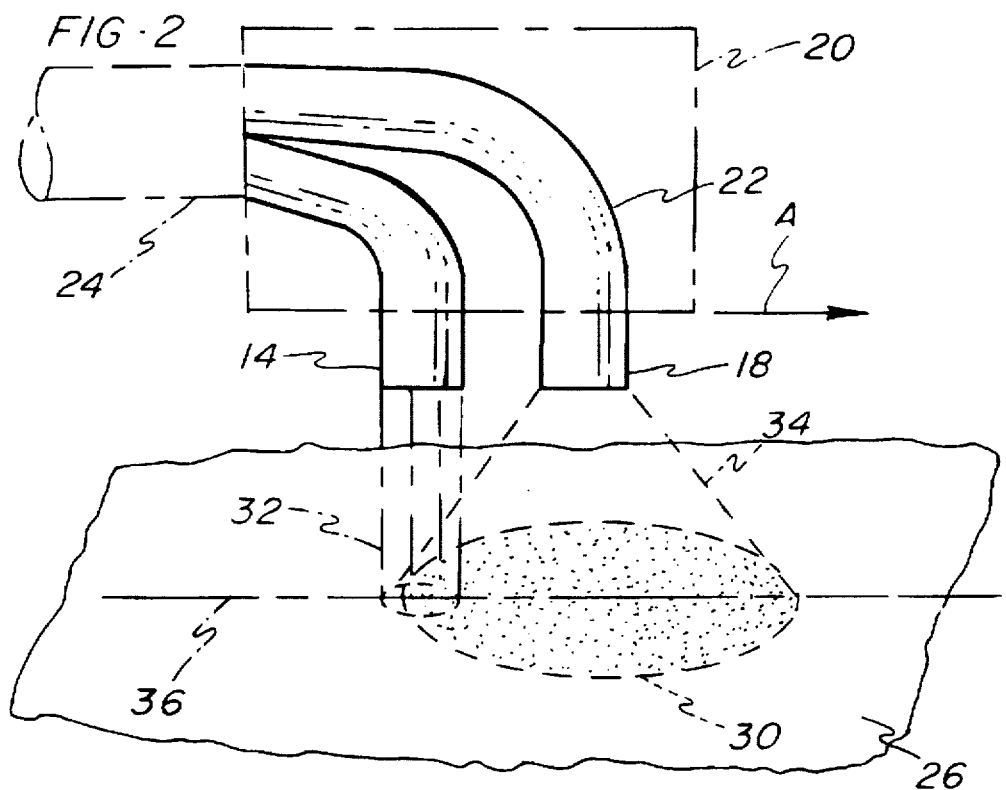
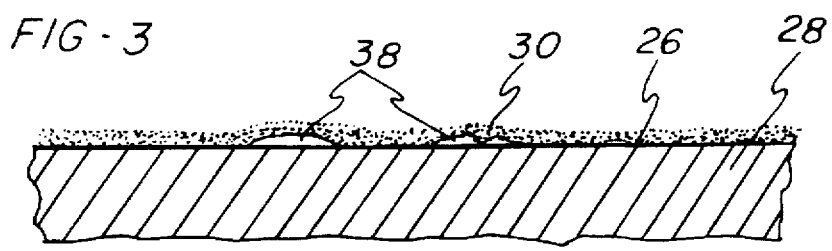

METHOD AND APPARATUS FOR MINIMIZING DEGRADATION OF EQUIPMENT IN A LASER CLEANING TECHNIQUE

BACKGROUND OF THE INVENTION

1. Field of the Invention

The present invention relates to a system for cleaning equipment, and more particularly, to a system for cleaning equipment, such as molds, using a laser wherein degradation of the equipment during the cleaning operation is minimized or eliminated.

2. Description of the Prior Art

In a typical molding operation, a mold having interior surfaces configured to correspond to the shape of an article to be molded is mounted in a press and the material used to form the article is supplied to the mold and molded in the desired shape. When the article is removed from the mold, a certain amount of residual material may remain on the interior mold surfaces. For example, when a molded rubber article is formed, residual material in the form of small pieces of rubber and/or release agents remain within the mold and must be removed through a cleaning process.

Various cleaning processes have been used for cleaning molds and most known cleaning processes incorporate a media which is introduced into the interior of the mold to impart a physical force to any residual material on the interior mold surfaces whereby the material is physically removed from the mold. Early known cleaning processes incorporated glass beads as the cleaning media which would be blown or blasted into the mold to perform a sandblasting type of cleaning operation. Subsequently, plastic beads were introduced as the cleaning media in order to reduce the amount of abrasion and damage which may occur to the interior of the mold tooling. More recently, solid $CO_2$ pellets have been used as the cleaning media in order to further reduce the abrasive affects of the cleaning operation on the tooling.

A problem associated with glass and plastic beads is the tendency of the bead media to become lodged or trapped within the mold which will have a deleterious effect on articles subsequently formed within the mold. Further, crevices in the mold can be difficult for the media to reach, particularly if the surfaces located within a crevice which cannot be directly blasted by the media. Also, the use of a cleaning media results in increased expense for operating the molding apparatus in that there is a continuing expense for the purchase and disposal of the media used for the cleaning.

In an alternative cleaning process, a laser is used to perform the mold cleaning operation. The laser has the advantage of avoiding the use of a physical cleaning media and thus simplifies the cleaning procedure. Such a laser cleaning device is disclosed in U.S. Pat. No. 5,373,140 issued to Nagy et al. and assigned to the assignee of the present invention.

One difficulty which has been identified in the cleaning of molds using a laser system has been the development of hot spots on the mold during the cleaning operation. When a hot spot develops on the mold surface, oxidation of the mold surface around the hot spot may occur. While such oxidation may not be readily visible when viewing the mold surface, the oxidation spots may result in discolored areas being formed on parts produced in the mold. Thus, the finished part may have areas which detract from its aesthetic appearance as a result of oxidation of the mold occurring during the cleaning operation.

SUMMARY OF THE INVENTION

The present invention is directed toward a method and apparatus for cleaning equipment surfaces using a light source including a laser wherein a barrier layer is provided for inhibiting degradation or oxidation of the surface by the light from the laser.

In one aspect of the invention, a method of cleaning a surface is provided comprising the steps of providing a light source including a laser, aligning an output end of the light source with the surface, forming a barrier layer on the surface and causing light from the light source to impinge on the barrier layer and the surface to thereby clean residual material from the surface while avoiding degradation or oxidation of the surface. The output end of the light source is caused to move along a path which traverses the surface, and the barrier layer is formed at points along the path preceding impingement of the light upon the surface.

In a further aspect of the invention, the barrier layer is produced by a vapor formed above the surface. The vapor adheres or condenses on the surface to form a thin liquid layer. The vapor may be in the form of a gaseous vapor such as water vapor.

In another aspect of the invention, the barrier layer is in the form of a gel which may be brushed or sputtered onto the surface prior to impinging the light from the laser on the surface.

In a further aspect of the invention, the barrier layer is defined by a gas layer formed adjacent to the surface, such as a layer of inert gas or other gas which does not contain oxygen.

In yet another aspect of the invention, an apparatus is provided for cleaning equipment comprising a light source including a laser, and means for forming a barrier layer on the surface for inhibiting degradation or oxidation of the surface. The means for forming a barrier layer may comprise a conduit having a discharge end wherein the conduit supplies a fluid to the surface. In addition, the discharge end of the conduit may be located adjacent to an output end of the light source such that the barrier layer is formed at locations on the surface just prior to those locations on the surface being impinged by light from the light source.

Therefore, it is an object of the present invention to provide a method of cleaning equipment using a laser wherein degradation or oxidation of the surface during the cleaning operation is minimized.

It is a further object of the invention to provide a method of cleaning equipment using a laser wherein a barrier layer is formed at a surface to be cleaned in order to minimize degradation of the surface.

It is yet another object of the invention to provide an apparatus for cleaning equipment including a laser and means for forming a barrier layer at a surface to be cleaned in order to inhibit degradation of the surface.

Other objects and advantages of the invention will be apparent from the following description, the accompanying drawings and the appended claims.

BRIEF DESCRIPTION OF THE DRAWINGS

FIG. 1 is a schematic diagram illustrating a laser unit in accordance with the present invention for cleaning a portion of a mold;

FIG. 2 is a close-up view illustrating a method and apparatus for performing a cleaning operation in accordance with the present invention; and FIG. 3 is a magnified view of a surface, such as a mold surface, having a barrier layer formed thereon in preparation for a laser cleaning.

DETAILED DESCRIPTION OF THE PREFERRED EMBODIMENT

Referring to FIG. 1, an apparatus in accordance with the present invention comprises a light source 10 including a cart 8 and a laser 12 supported on the cart 8 such that the light source 10 is portable. The light source 10 includes an output end 14 for directing light from the laser 12 onto a surface to be cleaned. In addition, a fluid source 16 is supported on the cart 8 and includes a discharge end 18 located adjacent to the output end 14 for the light source 10. The fluid source 16 preferably provides a source of gaseous fluid, such as water vapor.

For the purposes of illustrating the present invention, the output end 14 and discharge end 18 are shown mounted to a common module 20 which may be manipulated by an operator. Further, the light from the laser 12 is conducted to the output end 14 by means of a beam delivery system, such as optical fibers or mirrors, and the fluid from the fluid source 16 is conducted to the discharge end 18 by means of a fluid conduit 22. Both the beam delivery system and the fluid conduit may be contained in a common conduit 24 extending from the cart 8 to the module 20. The output end 14 and discharge end 18 are adapted to be aligned with equipment surfaces, such as the surfaces 26 of a mold 28.

The mold 28 is a metal tooling component which is typically mounted in a press for a molding operation. Subsequent to a molding operation, the mold 28 may include material used to form the molded article, such as release agents or other residual material. For example, when a rubber or elastomeric article is molded within the mold 28, residual release agents and pieces of rubber will remain in the mold and must be cleaned out prior to using the mold 28 for a further molding operation.

In order to clean the residual material from the mold 28, the cart 8 may be moved to a point adjacent to the mold 28 in order to permit the module 20 to be moved into association with the mold surfaces 26. The laser 12 is preferably a pulsed laser for providing light to the output end 14 in a manner similar to that described in U.S. Pat. No. 5,373,140, assigned to the assignee of the present invention, and incorporated herein by reference. Thus, when the light source 10 or laser 12 is turned on to provide light to the output end 14, the light will impinge upon the mold surfaces 26 to thereby remove residual material.

The light from the laser may include hot spots which heat the mold surface 26 to a higher than desired temperature, thus causing oxidation of various portions of the mold surface 26. Referring to FIG. 2, the present invention provides a solution to the problem of the laser causing mold surface degradation in the form of oxidation in that a barrier layer 30 is provided on the mold surface 26 prior to light 32 from the laser 12 impinging on the surface 26. The barrier layer 30 is formed by a gaseous fluid or vapor 34 which discharges from the discharge end 18 at locations above the surface 26 wherein the vapor 34 condenses on the surface 26 to form a thin barrier layer 30.

During a cleaning operation, the module 20 is positioned such that the output end 14 is aligned with the surface 26, and the module is moved in the direction A such that the light from the laser 32 is traversed across the surface 26 and follows a path denoted by line 36. The discharge end 18 is located such that the barrier layer 30 is formed at points along the path 36 which precede the impingement of the light 32 on the surface 26 such that the light 32 will impinge on both the barrier layer 30 and surface 26. In addition, it should be noted that the laser light 32 will typically pass through the vapor 34 as it travels toward the surface 26.

As illustrated in the magnified view of the surface 26 shown in FIG. 3, the barrier layer 30 is a thin layer which coats the surface 26 as well as any residual material 38 to be cleaned from the surface 26 by the laser light 32. The barrier layer 30 is preferably formed as a thin transparent layer of material through which the laser light may readily pass. The barrier layer 30 acts to cause the energy from the laser light 32 to be relatively evenly distributed in the area of impingement of the laser light on the surface 26 to thereby inhibit degradation of the surface 26, for example oxidation, which could result from localized hot spots on the surface 26. In addition, the barrier layer 30 acts to prevent oxygen from reaching the hot surface 26 as it is impinged by the laser light 32, thereby preventing oxidation from occurring.

It should be noted that although water vapor is disclosed as the fluid provided by the fluid source 16 and discharged out the discharge end 18, other vaporized fluids may be provided for condensing on the surface 26 to form a barrier layer 30. In addition, it is contemplated that other substances may be used to form a barrier layer for inhibiting degradation caused by oxidation of the surface. For example, the barrier layer 30 may be in the form of a gel which is brushed or sputtered onto the surface 26. Further, the barrier layer may be applied to all of the mold surfaces to be cleaned prior to activating the laser light source 10 to clean the mold.

Alternatively, the barrier layer 30 may be defined by a gas layer formed adjacent to the surface 26. For example an inert gas, such as dry nitrogen or other gas which does not contain oxygen, may be dispensed as the gaseous vapor from conduit 22, as illustrated in FIG. 2. As the gas forms a layer at the surface 26, it purges the oxygen from the entire area impinged by the laser light 32, thereby preventing oxidation from occurring.

It should also be noted that although the light source 10 is disclosed as a portable unit, it may also be provided as a stationary unit dedicated to a particular mold and may be provided as part of an automated operation. Further, it should also be understood that the vapor provided above the mold surface for forming the barrier layer may be provided by other means than the conduit disclosed, such as in a vapor chamber or by other means for providing vapor to the surface.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of cleaning equipment comprising the steps of:

aligning a light source including a laser with a surface to be cleaned;

forming a barrier layer at said surface;

activating said laser to cause light from said light source to impinge on said barrier layer and said surface to thereby clean residual material from said surface;

wherein said barrier layer inhibits degradation of said surface by said light; and wherein said step of forming a barrier layer includes condensing water vapor on said surface.

2. The method as recited in claim 1 wherein said light source comprises an output end for directing said light onto said surface and said fluid is provided through a conduit having a discharge end, said output end and said discharge end being located adjacent to each other.

3. The method as recited in claim 1 including the step of causing said light source to move along a path relative to said surface and forming said barrier layer at points along said path preceding impingement of said light on said surface.

4. The method as recited in claim 1 wherein said barrier layer substantially prevents oxidation of said surface.

5. The method as recited in claim 1 wherein said surface is a mold surface and said residual material includes material remaining on said mold surface after a molding operation.

6. The method as recited in claim 1 wherein said barrier layer is substantially transparent to light from said light source.

7. The method as recited in claim 1 wherein said laser is a pulsed laser.

8. The method as recited in claim 1 wherein said surface comprises a mold surface and said step of forming a barrier layer includes forming said barrier layer on all of the mold surfaces to be cleaned prior to activating said laser.

9. A method of cleaning equipment comprising the steps of:

aligning a light source including a laser with a surface to be cleaned;

forming a barrier layer at said surface;

activating said laser to cause light from said light source to impinge on said barrier layer and said surface to thereby clean residual material from said surface; and wherein said barrier layer inhibits degradation of said surface by said light and said step of forming a barrier layer includes covering said surface with a gel.

10. A method of cleaning a surface comprising the steps of:

providing a light source including a laser;

aligning an output end of said light source with said surface;

forming a barrier layer by condensing water vapor on said surface;

causing light from said light source to impinge on said barrier layer and said surface to thereby clean residual material from said surface while avoiding degradation of said surface; and wherein said output end of said light source is caused m move along a path traversing said surface and said barrier layer is formed at points along said path preceding impingement of said light on said surface.

11. The method as recited in claim 10 wherein said step of forming a barrier layer includes the steps of providing said water vapor above said surface, and said water vapor condensing on said surface.

12. The method as recited in claim 11 wherein said water vapor is conveyed through a conduit to a discharge end of said conduit wherein said discharge end of said conduit is directed toward said surface.

13. The method as recited in claim 12 wherein said discharge end of said conduit is located adjacent to said output end of said light source.

14. The method as recited in claim 10 wherein said surface is a mold surface and said residual material includes material remaining on said mold surface after a molding operation.

15. The method as recited in claim 10 wherein said barrier layer is substantially transparent to light from said light source.

16. The method as recited in claim 10 wherein said barrier layer is defined by a thin fluid layer deposited on said surface.

17. The method as recited in claim 10 wherein said barrier layer substantially prevents oxidation of said surface.

18. An apparatus for cleaning equipment comprising:

a light source including a laser;

an output end on said light source for aligning with a surface to be cleaned;

means for forming a barrier layer on said surface for inhibiting degradation of said surface;

wherein activation of said laser, with said output end aligned with said surface, causes light from said light source to impinge on said barrier layer and said surface to remove residual material attached to said surface; and wherein said means for forming a barrier layer comprises a conduit having a discharge end and said conduit is connected to a source of water vapor for supplying water vapor to be condensed on said surface to form said barrier layer.

19. The apparatus as recited in claim 18 wherein said discharge end is located adjacent to said output end such that said barrier layer is formed at locations adjacent to points on said surface impinged by said light.

* * * * *

UNITED STATES PATENT AND TRADEMARK OFFICE
CERTIFICATE OF CORRECTION

PATENT NO. : 5,637,245
DATED      : June 10, 1997
INVENTOR(S) : Timothy F. Shelton and Jeffrey L. Dulaney It is certified that error appears in the above-indentified patent and that said Letters Patent is hereby corrected as shown below:

In column 5, line 48, delete "m" and insert --to--.

Signed and Sealed this

Nineteenth Day of August, 1997

*Attest:*

BRUCE LEHMAN

*Attesting Officer*    Commissioner of Patents and Trademarks